United States Patent
Stenvall

(10) Patent No.: US 9,130,435 B2
(45) Date of Patent: Sep. 8, 2015

(54) MOTOR VEHICLE DRIVE UNIT

(71) Applicant: VOLVO CAR CORPORATION, Goeteborg (SE)

(72) Inventor: Lars Johan Stenvall, Ljungskile (SE)

(73) Assignee: Volvo Car Corporation, Gothenburg (SE)

(*) Notice: Subject to any disclaimer, the term of this patent is extended or adjusted under 35 U.S.C. 154(b) by 278 days.

(21) Appl. No.: 13/737,773

(22) Filed: Jan. 9, 2013

(65) Prior Publication Data
US 2013/0175893 A1    Jul. 11, 2013

(30) Foreign Application Priority Data

Jan. 10, 2012   (EP) .................................. 12150535

(51) Int. Cl.
    *H02K 7/20* (2006.01)
    *H02K 16/00* (2006.01)
    *H02K 7/00* (2006.01)
    *H02K 9/06* (2006.01)
    *B60L 11/18* (2006.01)
    *B60L 15/20* (2006.01)
    *B60K 1/00* (2006.01)

(52) U.S. Cl.
CPC ............. *H02K 16/005* (2013.01); *B60K 1/00* (2013.01); *B60L 11/1803* (2013.01); *B60L 15/2036* (2013.01); *H02K 7/006* (2013.01); *H02K 9/06* (2013.01); *B60K 2001/001* (2013.01); *B60L 2220/52* (2013.01); *B60L 2240/423* (2013.01); *H02K 16/00* (2013.01); *Y02T 10/641* (2013.01); *Y02T 10/642* (2013.01); *Y02T 10/7005* (2013.01); *Y02T 10/7275* (2013.01)

(58) Field of Classification Search
CPC ........................................................ H02K 16/00
USPC ...................... 310/112, 113, 114, 83; 701/22; 180/65.285
See application file for complete search history.

(56) References Cited

U.S. PATENT DOCUMENTS

| | | | |
|---|---|---|---|
| 6,707,268 B1 | 3/2004 | Bell et al. | |
| 7,466,053 B1* | 12/2008 | Radev | ............................ 310/114 |
| 2002/0017892 A1 | 2/2002 | Arimitsu et al. | |
| 2003/0010547 A1* | 1/2003 | Wachauer | .................... 180/65.1 |
| 2005/0124451 A1 | 6/2005 | Morikawa | |
| 2009/0140687 A1* | 6/2009 | Pettey | ............................ 318/663 |
| 2011/0001364 A1* | 1/2011 | Oya et al. | .................... 310/12.15 |
| 2012/0197474 A1 | 8/2012 | Pieralisi | |

FOREIGN PATENT DOCUMENTS

WO    2011/042317    4/2011

OTHER PUBLICATIONS

European Search Report for Application No. 12150535.8-1242 dated Aug. 20, 2012.

* cited by examiner

*Primary Examiner* — Hanh Nguyen
(74) *Attorney, Agent, or Firm* — Brooks Kushman P.C.

(57) ABSTRACT

A motor vehicle drive unit and an automotive vehicle comprising such a motor vehicle drive unit are provided. An electric motor has a rotor and a main stator rotatably mounted to a support structure. A first transmission provides an output to a first wheel axle shaft from the rotor. A second transmission provides an output to a second wheel axle shaft from the main stator. An auxiliary stator at least partially surrounds the main stator and is held stationary relative to the main rotatably mounted stator. A control unit is provided for controlling the auxiliary stator to add or subtract power to the main rotatably mounted stator.

20 Claims, 2 Drawing Sheets

MOTOR VEHICLE DRIVE UNIT

CROSS-REFERENCE TO RELATED APPLICATIONS

This application claims foreign priority benefits under 35 U.S.C. §119(a)-(d) to European patent application number EP 12150535.8, filed Jan. 10, 2012, the disclosure of which is incorporated herein by reference in its entirety.

TECHNICAL FIELD

Embodiments herein relate to a motor vehicle drive unit as well as an automotive vehicle comprising such a motor vehicle drive unit.

BACKGROUND

A motor vehicle drive unit for an electrical vehicle is usually connected to at least two driven wheels, one arranged at a respective side of the vehicle. Having two driven wheels arranged at a respective side of a vehicle normally makes it a requirement to provide a differential transmission in order to distribute torque equally between the driven wheels.

Additionally, vehicle weight to torque ratio and wheel diameter to top speed ratio usually means that at least a single speed two stepped reduction gear is required between the motor and each driven wheel. The reduction ratio of such a single speed reduction gear becomes a compromise between vehicle acceleration and top speed.

Further, limitations are also incurred by the motor rotor mechanical speed limits. These limitations affect the performance and usability of electric vehicles. One solution to the above would be to use a multi speed transmission. However, this usually incurs a higher cost and an increased weight.

Another solution is proposed by WO 2011042317, in which is proposed a motor vehicle drive unit for an electrical vehicle comprising an electric motor, a stator of which is rotatably mounted on two fixed supports joined to a frame of a vehicle. An axle shaft of a wheel is connected to a stator of the electric motor and an axle shaft of another other wheel is connected to a rotor of the electric motor. A rotation reversing device is provided to reverse the rotation of one of the two axle shafts of the wheels with respect to the rotation of the rotor or stator, respectively.

The electric motor proposed by WO 2011042317 may be of alternating current type and comprise a rotary electric contact to electrically connect the rotary stator to an electronic regulation unit. The electronic regulation unit may comprise a transformer to transform direct current of a battery into alternating current and an inverter to control the frequency of the alternating current sent to the electric motor. A respective reduction gear may be mounted such that an axle shaft on which a respective wheel is to be mounted protrudes therefrom.

SUMMARY

Embodiments herein aim to provide an improved motor vehicle drive unit of the aforementioned kind having an electric motor with a rotor and a counter rotating stator.

This is provided by a motor vehicle drive unit comprising: an electric motor having a rotor and a main stator rotatably mounted to a support structure; a first transmission providing an output to a first wheel axle shaft from the rotor; a second transmission providing an output to a second wheel axle shaft from the main stator, which is characterized in that it further comprises: an auxiliary stator at least partially surrounding the main stator and held stationary relative to the main rotatably mounted stator; and means for controlling the auxiliary stator to add or subtract power to the main rotatably mounted stator.

The provision of an auxiliary stator and means for controlling the auxiliary stator enables improved drive unit control through torque vectoring. Hereby more torque may e.g. be applied to an outer wheel as a vehicle equipped with the drive unit travels through a curve. This will provide a steering effect, steering the vehicle into the curve such that more torque may be transferred to the road without incurring wheel spin. Torque vectoring of this kind also enables compensating strong side winds or the application of torque to the drive wheel at one side if the vehicle in order to straighten up the vehicle from a skid.

According to a second aspect the auxiliary stator is arranged coaxially encircling the main stator.

The provision of the auxiliary stator being arranged coaxially encircling the main stator, as described for the second aspect, enables improved torque vectoring abilities.

According to a third aspect cooling fins are arranged at the periphery of the main rotatably mounted stator.

The provision of cooling fins at the periphery of the main rotatably mounted stator, as described for the third aspect, enables improved cooling of the electric motor as the main rotatably mounted stator rotates through ambient air.

According to a fourth aspect the main rotatably mounted stator is enclosed by an air duct cover.

The provision of an air duct cover encircling the main rotatably mounted stator, as described for the fourth aspect, enables improved control of cooling of the electric motor whilst preventing fouling thereof, especially fouling of the cooling fins arranged at the periphery thereof, which could otherwise degrade the cooling ability thereof.

According to a fifth aspect the cooling fins are arranged to provide a fan within the air duct cover upon rotation of the main stator.

Cooling fins arranged to provide a fan within the air duct cover upon rotation of the main stator, as described for the fifth aspect, provides for improved cooling of the electric motor when provided with a protective air duct cover.

According to a sixth aspect the cooling fins are screw thread shaped such as to provide an air screw fan within the air duct cover upon rotation of the main stator.

Screw thread shaped cooling fins, as described for the sixth aspect, provides for an efficient air screw fan for cooling of the electric motor.

According to a seventh aspect the cooling fins are fan blade shaped such as to provide a blade fan within the air duct cover upon rotation of the main stator.

The provision of cooling fins that are fan blade shaped, as described for the seventh aspect, enables an efficient blade fan for cooling of the electric motor.

According to an eight aspect an auxiliary fan unit is provided for producing a flow of cooling air passing over the cooling fins within the air duct cover.

The provision of an auxiliary fan unit, as described for the eight aspect, enables producing a flow of cooling air passing over the cooling fins at the periphery of the main rotatably mounted stator within the air duct cover also when the main rotatably mounted stator does not rotate, thus providing for improved cooling of the electric motor also when an associated vehicle is stationary.

According to a ninth aspect one of the first transmission and the second transmission comprises a chain drive reduction and the other a gear drive reduction.

The provision of one of the first transmission and the second transmission comprising a chain drive reduction and the other a gear drive reduction, as described for the ninth aspect, provides for simple and compact transmissions which produce the same direction of rotation at the respective outputs to the first and second wheel axle shafts.

According to a tenth aspect the chain drive reduction and the gear drive reduction have the same gear ratio.

The provision of the chain drive reduction and the gear drive reduction having the same gear ratio, as described for the tenth aspect, enables use of identical or no additional gearing between the respective outputs to the first and second wheel axle shafts and a respective associated drive wheel.

BRIEF DESCRIPTION OF THE DRAWINGS

In the following, embodiments herein will be described in greater detail by way of example only with reference to attached drawings, in which.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Figure 1:
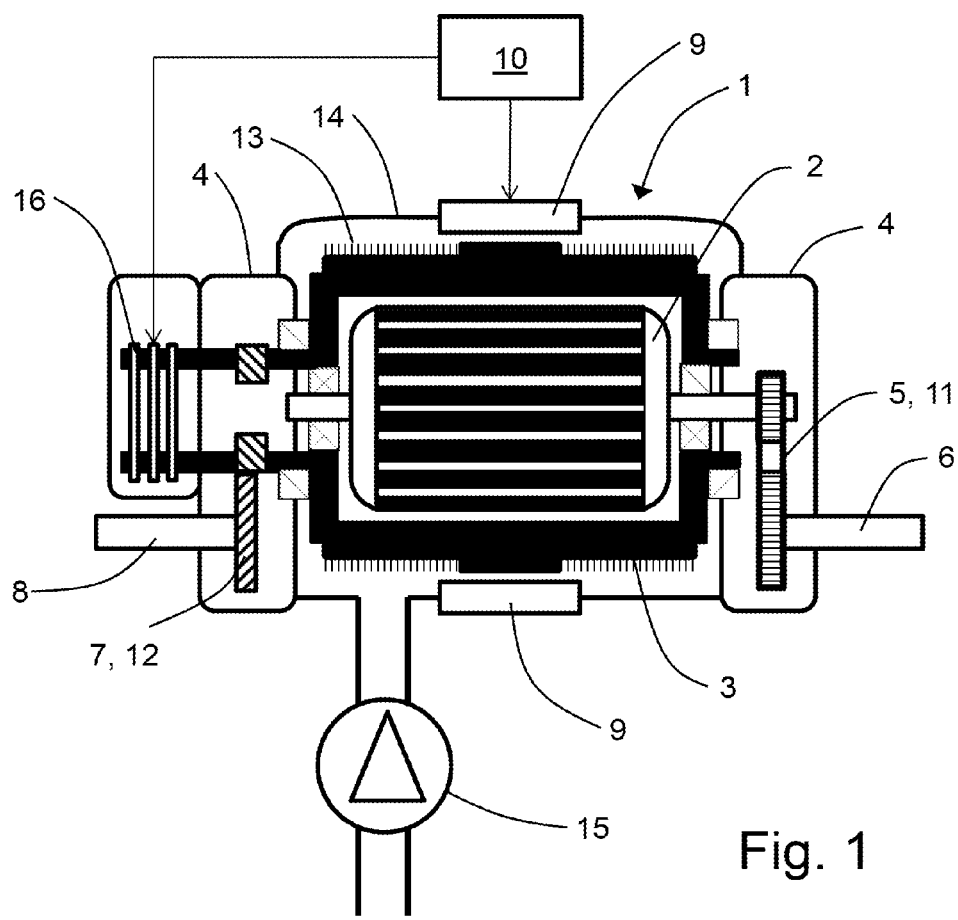
FIG. 1 is a schematic illustration of an embodiment of a motor vehicle drive unit according to embodiments hereof.
Figure 2:
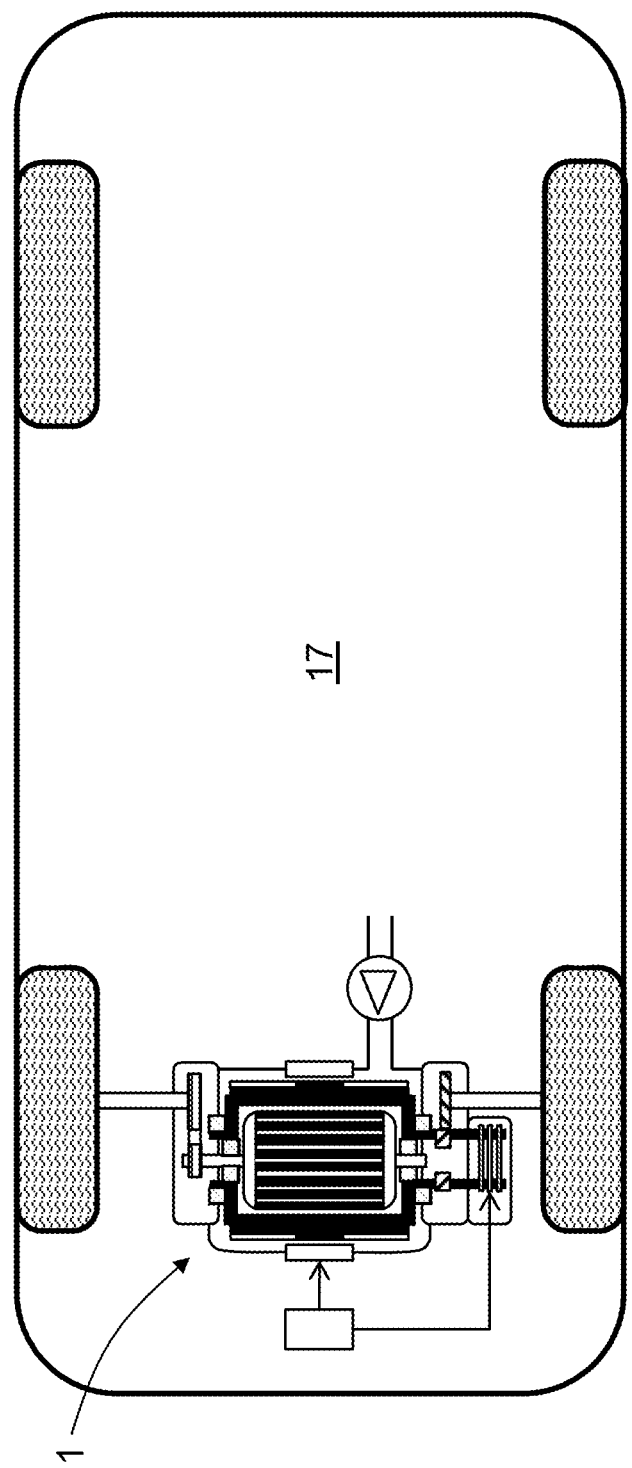
FIG. 2 is a schematic illustration of an automotive vehicle comprising a motor vehicle drive unit according to FIG. 1.

In overview, embodiments herein, as shown schematically in FIG. 1, relate to a motor vehicle drive unit 1 comprising an electric motor, such as e.g. a three phase asynchronous electric motor. The electric motor has a rotor 2 and a main stator 3. The main stator 3 is rotatably mounted to a support structure 4, which support structure 4 is adapted to be attached stationary to a chassis of an associated vehicle. Three slip rings 16 are provided for the transfer of electrical power to the main rotatably mounted stator 3.

In order to ensure temperature control of the electric motor in embodiments hereof cooling fins 13 are arranged at the periphery of the main rotatably mounted stator 3. This provides improved cooling of the electric motor, especially if the electric motor is arranged such that ambient air may flow freely over the cooling fins 13 of the rotating main stator 3 during travel of an associated vehicle.

Further improved control of cooling of the electric motor may be achieved through the main rotatably mounted stator 3 being enclosed by an air duct cover 14. Such an air duct cover 14 may also prevent fouling of the rotatably mounted stator 3, especially fouling of the cooling fins 13 arranged at the periphery thereof. The protection afforded by such an air duct cover 14 thus prevents fouling of the cooling fins 13, which could otherwise degrade the cooling ability thereof.

Still further improved control of cooling of the electric motor may be achieved through the cooling fins 13 being arranged to provide a fan within the air duct cover 14 upon rotation of the main stator 3. Such a fan being arranged to draw ambient air for cooling into the air duct cover 14 and past the cooling fins 13 within the air duct cover 14.

In embodiments hereof the cooling fins 13 are screw thread shaped such as to provide an air screw fan within the air duct cover 14 upon rotation of the main stator 3. Hereby is provided an efficient air screw fan for cooling of the electric motor.

In alternative embodiments hereof the cooling fins 13 are fan blade shaped such as to provide a blade fan within the air duct cover 14 upon rotation of the main stator 3. Hereby is provided an efficient blade fan for cooling of the electric motor.

In order to provide for improved cooling of the electric motor also when an associated vehicle is stationary in embodiments hereof an auxiliary fan unit 15 is provided for producing a flow of cooling air passing over the cooling fins 13 within the air duct cover 14. Such an auxiliary fan unit 15 thus produces a flow of cooling air which passes over the cooling fins 13 at the periphery of the main rotatably mounted stator 3 within the air duct cover 14 also when the main rotatably mounted stator 3 does not rotate, i.e. when the electric motor is not operated.

A first transmission 5 provides an output to a first wheel axle shaft 6 from the rotor 2. A second transmission 7 provides an output to a second wheel axle shaft 8 from the main stator 3. In embodiments hereof one of the first transmission 5 and the second transmission 7 comprises a chain drive reduction 11 and the other a gear drive reduction 12. Such a setup allows for the use of simple and compact transmissions which produce the same direction of rotation at the respective outputs to the first and second wheel axle shafts. Hereby low cost and low complexity of the transmissions may be ensured.

In embodiments hereof the chain drive reduction 11 and the gear drive reduction 12 have the same gear ratio. This configuration enables use of identical or no additional gearing between the respective outputs to the first and second wheel axle shafts and a respective associated drive wheel. Hereby low cost and low complexity of any such additional gearing may be ensured.

In embodiments having a three phase asynchronous electric motor, in order to produce power such a motor requires a difference in rotational speed between the rotor 2 and the main rotatably mounted stator 3. Since the main rotatably mounted stator 3 in this setup now rotates with the same absolute rotational speed as the rotor 2, but in the opposite direction, the power produced will be proportional to the relative difference in rotational speed between the rotor 2 and the main rotatably mounted stator 3, i.e. two times the absolute rotational speed. Since at least one factor limiting the performance of the electric motor is the mechanical stress which the rotor 2 is subjected to, the above proposed setup will reduce the forces it is subjected to by four for any given rotational speed, as compared to setups without counter rotating rotor and stator. Consequently the acting inertia on the wheels of an associated vehicle will also be four times less, which in turn will be beneficial for improving response times of any active chassis systems provided to the associated vehicle. The lowered requirement for rotor 2 speed also means that the reduction provided by the chain drive reduction 11 and the gear drive reduction 12 respectively may be performed in one step.

The motor vehicle drive unit 1 further comprises an auxiliary stator 9, which auxiliary stator 9 at least partially surrounds the main stator 3 and is held stationary relative to the main rotatably mounted stator 3. In embodiments hereof the auxiliary stator 9 is arranged coaxially encircling the main stator 3. Means 10, such as one or more electronic control units, are provided for controlling the auxiliary stator 9 to add or subtract power to the main rotatably mounted stator 3.

The controllable auxiliary stator 9 enables improved drive unit 1 control through torque vectoring. Hereby more torque may e.g. be applied to an outer wheel as a vehicle equipped with the drive unit 1 travels through a curve. This will provide a steering effect, steering the vehicle into the curve such that more torque may be transferred to the road without incurring wheel spin. Torque vectoring of this kind also enables compensating strong side winds or the application of torque to the drive wheel at one side if the vehicle in order to straighten up the vehicle to recover from a skid. The proposed layout may also, when used in forward drive applications, be arranged to act as a power assisted steering, thus complementing or even replacing other systems for power assisted steering, such as electrical power assisted steering. When complementing other systems for power assisted steering it may e.g. be used to improve a turning radius of a vehicle through applying a differentiated torque to the steerable wheels at the right and left hand side of the vehicle after a maximum steering angle has been applied to these wheels.

As described above, the controllable auxiliary stator 9 may be used to apply or draw electrical current from the main rotatably mounted stator 3 whilst at the same time conversely drawing or applying this electrical current to the rotor 2, such that the total current consumption of the motor vehicle drive unit 1 remain constant.

Although the above embodiments have been described as having an electrical motor being a three phase asynchronous electric motor similar setups are obtainable using other types of electrical motors, such as e.g. synchronous electric motors or direct current electric motors.

In accordance with the present application is also envisaged an automotive vehicle 17 comprising a motor vehicle drive unit 1 as described above.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. A motor vehicle drive unit comprising:
    an electric motor having a rotor and a main stator rotatably mounted to a support structure;
    a first transmission providing an output to a first wheel axle shaft from the rotor;
    a second transmission providing an output to a second wheel axle shaft from the main stator;
    an auxiliary stator at least partially surrounding the main stator and held stationary relative to the main rotatably mounted stator; and
    means for controlling the auxiliary stator to add or subtract power to the main rotatably mounted stator.

2. A motor vehicle drive unit according to claim 1, wherein the auxiliary stator is arranged coaxially encircling the main stator.

3. A motor vehicle drive unit according to claim 1 further comprising cooling fins arranged at the periphery of the main rotatably mounted stator.

4. A motor vehicle drive unit according to claim 3, wherein the main rotatably mounted stator is enclosed by an air duct cover.

5. A motor vehicle drive unit according to claim 4, wherein the cooling fins are arranged to provide a fan within the air duct cover upon rotation of the main stator.

6. A motor vehicle drive unit according to claim 4, wherein the cooling fins are screw thread shaped such as to provide an air screw fan within the air duct cover upon rotation of the main stator.

7. A motor vehicle drive unit according to claim 4, wherein the cooling fins are fan blade shaped such as to provide a blade fan within the air duct cover upon rotation of the main stator.

8. A motor vehicle drive unit according to claim 4 further comprising an auxiliary fan unit for producing a flow of cooling air passing over the cooling fins within the air duct cover.

9. A motor vehicle drive unit according to claim 1, wherein one of the first transmission and the second transmission comprises a chain drive reduction and the other a gear drive reduction.

10. A motor vehicle drive unit according to claim 9, wherein the chain drive reduction and the gear drive reduction have the same gear ratio.

11. An automotive vehicle including a motor vehicle drive unit, the drive unit comprising:
    an electric motor having a rotor and a main stator rotatably mounted to a support structure;
    a first transmission providing an output to a first wheel axle shaft from the rotor;
    a second transmission providing an output to a second wheel axle shaft from the main stator;
    an auxiliary stator at least partially surrounding the main stator and held stationary relative to the main rotatably mounted stator; and
    means for controlling the auxiliary stator to add or subtract power to the main rotatably mounted stator.

12. A motor vehicle drive unit comprising:
    an electric motor comprising a rotor and a main stator adapted to be rotatably mounted to a support structure;
    a first transmission configured to provide an output to a first wheel axle shaft from the rotor;
    a second transmission configured to provide an output to a second wheel axle shaft from the main stator;
    an auxiliary stator adapted to at least partially surround the main stator and to be held stationary relative to the main stator; and
    a control unit configured to control the auxiliary stator to add or subtract power to the main stator.

13. A motor vehicle drive unit according to claim 12, wherein the auxiliary stator is configured to coaxially encircle the main stator.

14. A motor vehicle drive unit according to claim 12 further comprising cooling fins adapted for arrangement at the periphery of the main stator.

15. A motor vehicle drive unit according to claim 14, wherein the main stator is adapted to be enclosed by an air duct cover.

16. A motor vehicle drive unit according to claim 15, wherein the cooling fins are adapted to provide a fan within the air duct cover upon rotation of the main stator.

17. A motor vehicle drive unit according to claim 16, wherein the cooling fins are screw thread shaped such as to provide an air screw fan within the air duct cover upon rotation of the main stator.

18. A motor vehicle drive unit according to claim 16, wherein the cooling fins are fan blade shaped such as to provide a blade fan within the air duct cover upon rotation of the main stator.

19. A motor vehicle drive unit according to claim 15 further comprising an auxiliary fan unit adapted to produce a flow of cooling air over the cooling fins within the air duct cover.

20. A motor vehicle drive unit according to claim 12, wherein one of the first transmission and the second transmission comprises a chain drive reduction and the other a gear drive reduction.

* * * * *